United States Patent [19]

Wunsch et al.

[11] 4,247,172
[45] Jan. 27, 1981

[54] SETTING OR ADJUSTING MEANS FOR REARVIEW MIRRORS OF MOTOR VEHICLES

[76] Inventors: Erich Wunsch; Udo Wunsch; Eckart Wunsch, all of Im Hofrain 12, 7141 Schwieberdingen, Baden-Württemberg, Fed. Rep. of Germany

[21] Appl. No.: 32,039

[22] Filed: Apr. 23, 1979

Related U.S. Application Data

[62] Division of Ser. No. 725,667, Sep. 22, 1976, Pat. No. 4,159,866.

[30] Foreign Application Priority Data

| Sep. 30, 1975 | [DE] | Fed. Rep. of Germany | 2543512 |
| Oct. 15, 1975 | [DE] | Fed. Rep. of Germany | 2546091 |
| Dec. 23, 1975 | [DE] | Fed. Rep. of Germany | 2558457 |
| Mar. 4, 1976 | [DE] | Fed. Rep. of Germany | 2608919 |
| Aug. 25, 1976 | [DE] | Fed. Rep. of Germany | 2638143 |

[51] Int. Cl.³ .............................................. G02B 5/08
[52] U.S. Cl. .................................................. 350/289
[58] Field of Search ................ 350/279, 280, 281, 282, 350/289

[56] References Cited

U.S. PATENT DOCUMENTS

| 3,459,470 | 8/1969 | Hahn | 350/289 |
| 3,475,081 | 10/1969 | Russell | 350/279 |
| 3,664,729 | 5/1972 | Moore | 350/283 X |

*Primary Examiner*—F. L. Evans
*Attorney, Agent, or Firm*—Martin A. Farber

[57] ABSTRACT

A setting and adjusting device for rearview mirrors mounted on a vehicle body comprising a mirror housing adapted to be mounted on the vehicle body and a mirror plate having a rear surface and a front reflecting surface. The mirror plate is adjustably mounted in the housing for pivoting and tilting of the mirror plate about a substantially vertical axis and a substantially horizontal axis, respectively. End stops limit the pivoting and tilting of the mirror plate. Controllable adjusting devices upon actuation and release thereof, respectively, pivot and tilt the mirror plate about the horizontal and vertical axes into predetermined lateral and vertical positions, respectively, and against the stops, respectively. A pivot lever and a bearing head, respectively, are operatively mounted to the mirror plate so as to positively engage the mirror plate in a pivot and tilt direction, respectively, and so as to be freely moveable relative to the mirror plate in a non-pivoting and non-tilting direction, respectively. Frictional slip couplings independently connect the pivot lever and the bearing head to an associated adjusting device, respectively.

21 Claims, 12 Drawing Figures

SETTING OR ADJUSTING MEANS FOR REARVIEW MIRRORS OF MOTOR VEHICLES

This application is a division of Ser. No. 725,667, now U.S. Pat. No. 4,159,866.

The invention relates to a setting or adjusting means for rearview mirrors of motor vehicles or the like with the aid of which the rearward field of view of the driver can be adapted also when the vehicle is travelling both to his sitting and driving position and to the particular traffic situation.

To solve this problem a great variety of special forms of rearview mirrors has already been proposed but one of them has so far been completely satisfactory. Thus, a rearview mirror is known which has two mirror plates in which in addition to the normal mirror plate, which covers the rearward road area, a second mirror plate is provided which is angled with respect to the first along a substantially vertical line and covers an area lying more to the side of the vehicle so that with this mirror assembly a total of two images results. These two images frequently irritate the driver because simultaneous consideration and correct interpretation of the two images requires special concentration and, in particular, require practice. Experience has shown that many users of such divided mirrors require a long familiarization time before they can use them properly and in some cases never are able to do so. Moreover, the blind angle is still not completely eliminated because motor or pedestrian traffic, for example, directly adjacent a vehicle is still not visible and this is a frequent cause of serious accidents.

The problem underlying the present invention is therefore to construct a rearview mirror so that it provides adequate viewability not only of the rearward road area but also, preferably simultaneously, of the lateral area adjacent the vehicle up to the level of the driver and of the area beneath the lateral field of view and thus substantially eliminates a blind angle.

In accordance with this objective the invention provides a mirror plate pivotally mounted about substantially vertical and horizontal axes in a mirror housing, which is pivotally controllable into laterally and vertically tilted positions as follows:

In one embodiment a pivot lever (460) or bearing head (419) on the mirror plate (411) engages positively in the respective tilt direction but otherwise freely moveably, with a slip or friction clutch means (470; 447; 463; 465, 435) for independently connecting the pivot lever (460) and bearing head (419) to the associated adjusting means.

Still further according to the invention the bearing head (419) is disposed non-rotatably on a head shaft (462) which carries non-rotatably thereon a coupling disc (463) and a slip or brake lining disc (465), and the second fork (451) in spaced relationship with and substantially perpendicularly to the fork legs (454, 455) is traversed with clearance by the head shaft (462) and held by means of an adjusting nut (466) with interposed springs (467), preferably spring washers, on the head shaft (462) and is pressed with adjustable spring force against the slip or brake lining disc (465) and the coupling disc (463) and the mirror plate (411) when the second eccentric disc (441) and the second fork (451) are stationary, is tiltable by manual actuation about the spatially substantially horizontal axis (416) by the bearing head (419) with head shaft (462) and coupling disc (463) is pivotal, overcoming the static friction of the slip or brake lining disc (465), relatively to the second fork (451) about its bearing axis (420).

According to the invention, as an operative coupling in the device for rearview mirrors the slip clutch constitutes in each case operative coupling in the power path between a first fork (450) and a pivot lever (460) and in the power path between the second fork (451) and the bearing head (419), the slip clutch (447,435) being disposed with means for adjustable slip action.

According to a feature of the invention a constrained guide of the mirror plate is provided in which the pivot levers articulately connected to the rear plate are connected via a slip or friction coupling to the adjusting means so that on failure of the electric motor adjustment the mirror plate can also be set by hand.

Yet further the pivot lever (460) and the first fork (450) are mounted spaced from the fork legs (452, 453) pivotally on a pivot sleeve (461) which is pivotally moveable on a journal (424), on the pivot sleeve (461) between the pivot lever (460) and the first fork (450) a slip or brake lining disc (470) is disposed, the first fork (450) is adapted to be pressed by means of an adjusting nut (471) engaging the pivot sleeve (461) with interposed springs (472), preferably spring washers, with adjustable spring force against the slip or brake lining disc (470) and the pivot lever (460) in such a manner that the mirror plate (411) when the first eccentric disc (440) and the first fork (450) are stationary is pivotal by manual actuation about the spatially substantially vertical axis (415) by pivoting the lever (460), overcombing the static friction of the slip or brake lining disc (470), relatively to the first fork (450) about the axis of the pivot sleeve (461).

Another advantageous cooperation is provided by the invention by the pull-push mounting of the pivot lever (460) comprising a ball (480), preferably of plastic, at the pivot lever end and said ball bears on the back of the mirror plate (411), and a substantially angular flat spring (481) which is secured to the mirror plate back, the ball (480) being accommodated in the intermediate space which is defined by the angle leg (482) substantially parallel to the mirror plate (411) and in spaced relationship thereto on the one hand and the mirror plate back on the other.

According to another advantageous feature of the invention the first eccentric disc (440) with the first fork (450) and the second eccentric disc (441) with the second fork (451) each comprise an end stop means (484, 488, 489; 485; 486, 487) with associated gear decoupling (447, 435) by means of which the rotary movement of each eccentric disc (440, 441) is limitable in both drive directions of rotation (arrows a and b) to a peripheral angle of about 180° and the respective eccentric disc (440, 441) is separable from the drive torque of the associated gear motor (430, 431), and preferably that for the gear disengagement a slip clutch (447, 435) with preferably adjustable slip behaviour is disposed in each case between the eccentric disc (440, 441) is disposed in each case between the eccentric disc (440, 441) and its drive member (446, 434) of the associated gear motor (430, 431), and preferably that the slip behaviour of the slip clutch (447, 435) is adjustable via the axial tensioning force in such a manner that the torque necessary for overcoming the static friction of the slip clutch (447, 435) is greater than the drive torque necessary for the pivot drive or tilt drive of the mirror plate (411) about the spatially substantially vertical and horizontal axes (415, 416) between the end positions.

Further still in the invention each eccentric disc (440, 441) is rotatably mounted on a bush (444, 432) which is mounted on the associated gear motor (430, 431) preferably rotatable on a stationary journal (426; 427), and on said bush a drive gear (446, 434) meshing with the driven pinion (454, 433) of the gear motor (430, 431) is also mounted, that on the bush (444, 432) between the drive gear (446, 434) and the eccentric disc (440, 441) a slip or brake lining disc (447, 435) is arranged and that the eccentric disc (440, 441) is pressed by means of an adjusting nut (448, 436) engaging the bush (444, 432) with interposed springs (449, 437) preferably spring washers, with adjustable spring force against the slip or brake lining disc (447, 435) and the drive gear (446, 434) in such a manner that when the eccentric disc (440, 441, FIG. 11, FIG. 10) runs against one of the end stop means and is held fixed said disc may be uncoupled, overcoming the static friction of the slip or brake lining disc (447, 435), by the drive torque of the drive gear (446, 434), said gear continuing to rotate with reduced speed.

Also the invention provides such eccentric disc (440, 441) for forming the end stop means comprises on an end face, preferably on the end face remote from the gear motor (430, 431), an axially projecting projection, preferably a stop pin (484, 485), which is disposed near the outer peripheral surface and substantially on the peripheral region of greatest eccentricity.

According to still another feature, the invention provides that each fork, preferably the second fork (451), carries on the inside of each fork leg (454, 455) a projection substantially perpendicular thereto, preferably a blocking pin (486, 487), the projecting length of which is so dimensioned that with its free end it projects over the path through which the stop pin (485) travels radially up to the eccentric disc center and when the disc (441) is pivoted in both directions of rotation (arrows a and b) through in each case about 180° peripheral angle forms an end stop for the stop pin (485).

Yet further in accordance with the invention each fork (450; 451) preferably the first fork (450) two projections, preferably stud bolts (488, 489), fixed with respect to the housing are associated with the stop pin (484) and are disposed spaced from the disc end face remote from the gear motor (430, 431) at right angles to the disc axis of rotation on either side thereof at equal distances and lie on the track through which the stop pin (484, 485) travels when the eccentric disc (440, 441) is pivoted in both directions of rotation (arrows a and b) through in each case about 180° peripheral angle, the stud bolts (488, 489) forming with their free end face the end stop for the stop pin (484, 485), and preferably that the two fork legs (452, 453) of the first fork (450) each comprise at the lower end and in the front region facing the stud bolts (488, 489) a recess (490, 491) continuing up to the leg end for passage of the stud bolts (488, 489) when the fork is pivoted about its axis of the pivot sleeve (461).

Still further according to the invention the mirror housing (412) comprises at least two stops (494, 495) which are fixed with respect to the housing and disposed at the back of the mirror plate (411), one stop (494) of which forming an end stop limiting the maximum pivot angle on manual pivoting of the mirror plate (411) about the vertical axis (415) in one direction (FIG. 12, arrow b) while the other stop (495) forms an end stop which limits the maximum tilt angle of the mirror plate (411) on manual tilting about the substantially horizontal axis (416) in one direction (FIG. 10, arrow a) preferably in such a manner that after failure of the gear motor (430, 431) and effected manual adjustment of the mirror plate (411) when the gear motors are again ready for operation (430, 431) for the operative correct angular coupling between the pivot lever (460) and the first fork (450) or between the bearing head (419) and second fork (451) the mirror plate (411) may be pressed first manually in a pivot direction (FIG. 12, arrow a) and/or a tilt direction (FIG. 10, arrow a) against the associated stop (494, 495) and thereafter the associated gear motor (430, 431) may be switched on for pivot actuation or tilt actuation in the same pivoting or tilting direction until the eccentric disc (440, 441) has reached the associated end position and an accurate angular operational coupling is established.

The invention will be explained in detail hereafter with the aid of the examples of embodiment illustrated in the drawings, wherein.

Figure 1:
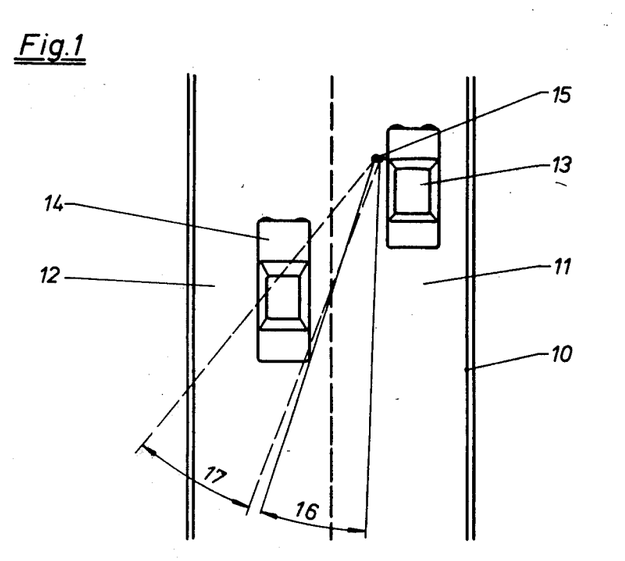
FIG. 1 is a schematic plan view of a road with two vehicles.

FIG. 1 shows a road 10 with a normal lane 11 and an overtaking lane 12 on which a vehicle 13 is being overtaken by a vehicle 14. The exterior rearview mirror 15 of the vehicle 13 is constructed according to the invention. In the rest position of the mirror 15 the driver of the vehicle 13 has the angle of view 16. The vehicle 14 is not visible in the mirror 15 of the vehicle 13. The angle 17 of view shown in dashed line results for the driver of the vehicle 13 when the mirror 15 had been adjusted out of the rest position about a substantially vertical axis to the left outwardly into a laterally tilted position. The vehicle 14 is then in the field of view of the driver and not in the blind angle.

Figure 2:
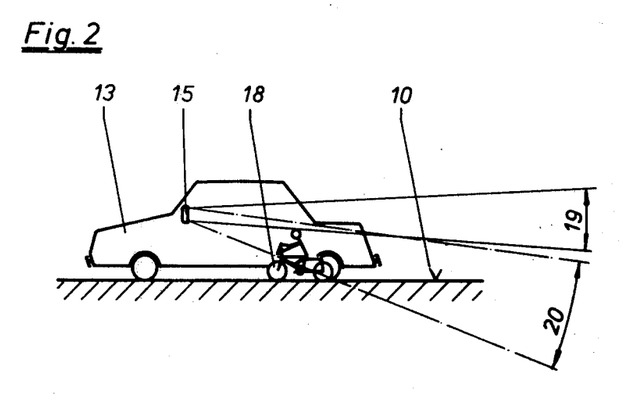
FIG. 2 is a schematic side elevation of the left side of a vehicle and a cyclist.

FIG. 2 shows alongside the vehicle 13, but beneath the lateral angle of view of the driver, a cyclist with bicycle 18. In the rest position of the mirror 15 the vertical angle of view 19 is obtained. The bicycle 18 is not visible for the driver of the vehicle 13. The mirror 15 obviates this blind angle as well. The vertical angle of view 20 results when the mirror is moved out of its rest position about a substantially horizontal axis downwardly into a vertically tilted position. The bicycle 18 is then visible in the mirror 15. Thus, a blind angle may be eliminated by means of the mirror both in the lateral direction and in the vertical direction. These two motions may be superimposed. The vertical tilting about the angle β results in the vertical angle of view 20 (FIG. 2) and the lateral tilting about the angle α in the lateral angle of view 17 (FIG. 1).

In the first embodiment (FIGS. 1–6) of a mirror the mirror plate 211 is moveably disposed in the mirror housing 212. By means of a remote-controllable adjusting means 213 the mirror plate 211 is pivotal by tilting against the action of a cylindrical coil spring 228 about the spatially substantially vertical 215 and/or horizontal axis 216. This is made possible by a ball joint having a ball 217 fixed on the housing 212 and a ball socket 218 mounted on the back of the mirror plate 211. The mounting is also effected by means of a two-axis joint whose centre is disposed in the continuation of the axis 216 spaced from the ball 217. The two-axis joint comprises a bearing head 219 which is mounted pivotally on the housing 212 about an axis 220 parallel to the horizontal axis 216 and comprises a guide slot 221 which extends substantially perpendicularly to the bearing axis 220. Also part of the two-axis joint is a cylindrical guide pin 222 which extends substantially perpendicularly to the mirror plate plane and is secured to the back of the mirror plate 211. The guide pin 222 passes through the guide slot 221, and it is pressed by a plate spring 227, practically without play in the direction of the slot and transversely thereof so that when the mirror plate pivots in the ball joint 217 or 218 about the axis 215 (arrow 223) a relative displacement occurs between the guide pin 222 and the guide slot 221 substantially in the longitudinal direction of the pin; whereas when the mirror plate tilts about the axis 216 (arrow 224) a positive coupling obtained between the guide slot 221 and guide pin 222 and a tilting movement about the axis 216 and the bearing axis 220 is thus effected (for example via a tab-like lever arm 225 which is connected to the bearing head 219.)

The coil spring 228 engages with one end 229 (FIG. 4) on the mirror plate 211 and is held with its other end 230 on the housing 212.

The adjusting means 213 comprises a first electrical gear motor 251 for the pivoting of the mirror plate 211 in the arrow direction 223 about the axis 215 and a second synchronized gear motor 252 for the tilting adjustment in the arrow direction 224 about the axis 216, these motors being mounted on the housing 212.

Mounted on the output shaft of the first gear motor 251 is an eccentric cam disc 253 as a pivoting adjusting element. Mounted on the output shaft of the second gear motor 252 is an eccentric cam disc 254 as a tilting adjusting element. The latter bears with the peripheral face on the side of the tab 225 remote from the mirror plate 211. The first cam disk 253 lies with its peripheral face, for example, directly on the back of the mirror plate 211 spaced from the ball joint 217, 218.

The electrical supply lines and control lines of the gear motors 252, 253 are arranged in the housing 212 and, for example, led to a compound slide switch in the interior of the vehicle via which the connection and control of the gear motors 251, 252 can be effected in the desired manner.

Figure 3:
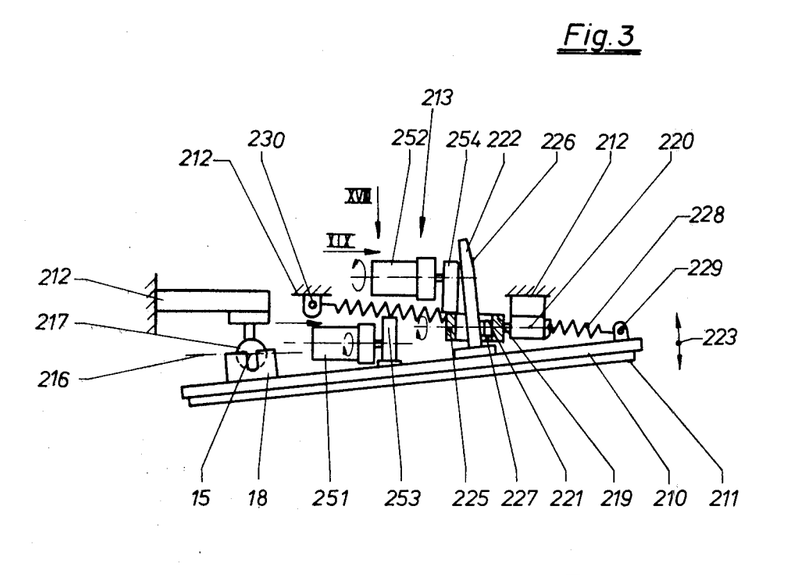
FIG. 3 is a schematic partially horizontally sectioned plan view of the essential parts of a mirror according to a first embodiment.
Figure 4:
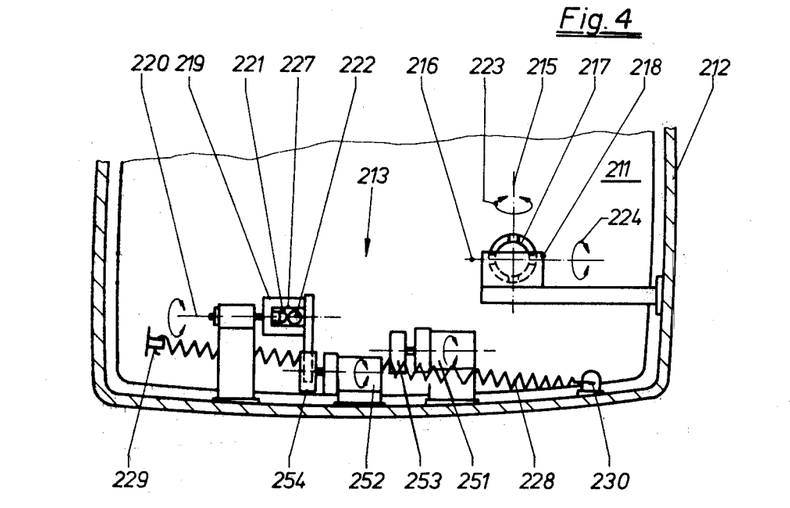
FIG. 4 is a rear view in the direction of the arrow XVIII of FIG. 3.
Figures 5, 6, 7:
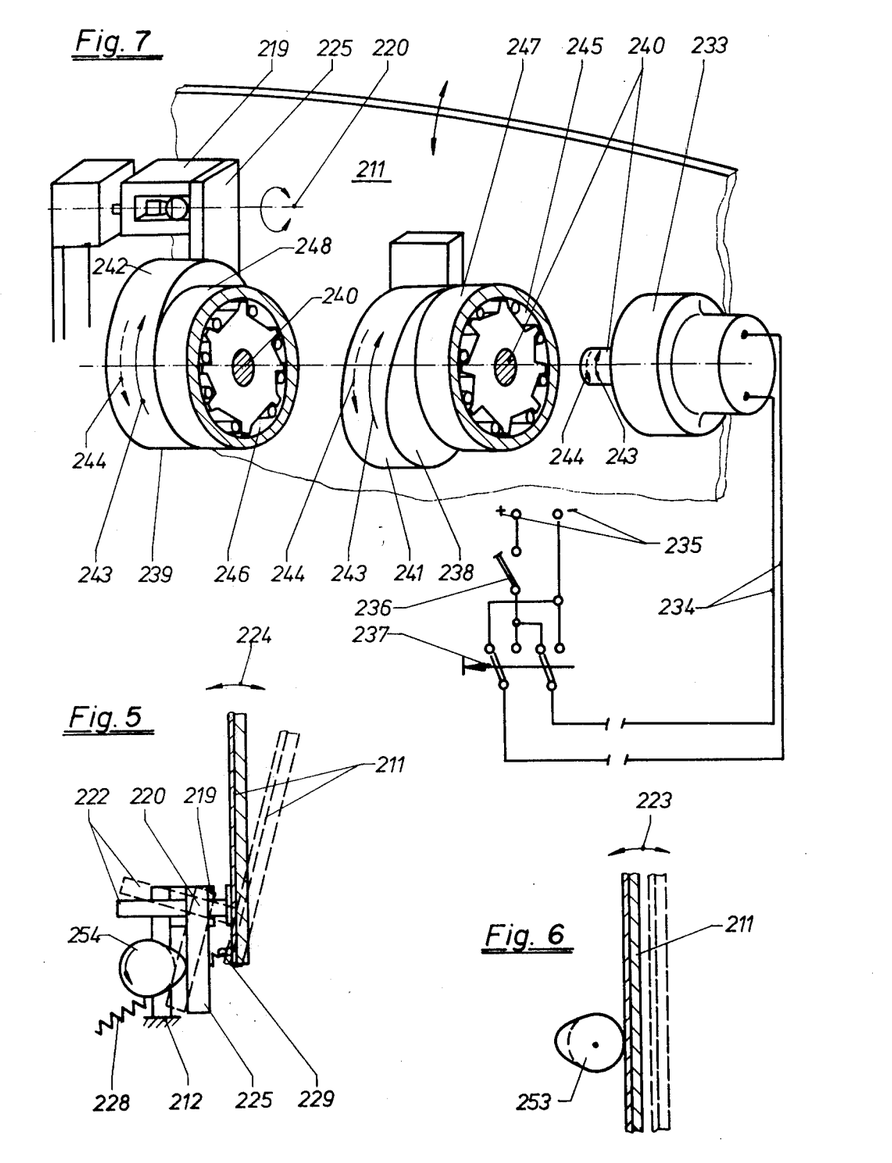
FIG. 5 is a detail, seen in the direction and height of the arrow XIX of FIG. 3.
FIG. 6 is a detail seen in the direction and height of the arrow XX of FIG. 3.
FIG. 7 is a schematic perspective rear view of the essential parts of a mirror according to the first embodiment.

In FIGS. 3 and 5 the second cam disk 254 is shown in a rotary position of maximum eccentricity (FIG. 5).

If by switching on the gear motor 252 the cam disc 254 is turned further out of the maximum eccentric position the mirror plate 211 is caused to follow via the spring 228 because the tab 225 is pressed via said spring against the cam disk 254. On minimum eccentricity of the cam disc 254 the tab 225 pivots to the left in FIG. 5. Via the coupling between the tab 225, the bearing head 219 with the guide slot 221 and the guide pin 222, the mirror plate 211 is also correspondingly inclined (dashed line in FIG. 5).

Regarding the pivot position of the mirror plate 211 about the axis 215, FIG. 3 shows an end inward position. The cam disc 253 is in a position of minimum eccentricity. If the gear motor 251 is switched on and the cam disc 253 turned from this position into the maximum eccentricity position the cam disc 253 presses onto the back of the mirror plate 211 and pivots it about the vertical axis 215 (arrow direction 223). The guide pin 222 then moves within the guide slot 221.

In FIG. 7, in contrast to the first embodiment, a single electric motor 233 is provided for the tilting adjustment (arrow 224) and the pivoting adjustment (arrow 223), the movements in the two directions of rotation 223 and 224 being brought about by changing the direction of rotation of the electric motor. The take off of the gear motor 233 is via the output shaft 240 thereof to two coaxial eccentric cam discs 238, 239 and the associated free-wheels. These two cam discs 238 and 239 move the mirror plate 211 via the associated tab 225 or directly via the eccentric cam 253 in the two directions of rotation according to the arrows 223 and 224.

The adjusting means 213 further comprises a single electrical reversible direct-current gear motor 233 which engages the tub link 225 and mirror plate 211 and is supplied from the vehicle electrical system 235 via a supply and control line 234 led out through the mirror holder 112. A switch 236 serves for switching on and switching off the motor 233 and a reversal switch 237 for reversing its direction of rotation.

The gear motor 233 acts via eccentric cams, via a first cam disc 238 and a second cam disc 239 on the tub link 225. The two cam discs 238, 239 are coaxially on the driven shaft 240 of the gear motor 133. Each cam disc 238, 239 is in bearing contact with the narrow face of the associated tub link 225 or mirror plate 211. The cam discs 238, 239 are so formed that the cam path 242 of the second cam disc 239 increases substantially continuously in the radial direction up to the eccentricity maximum in the direction of the first output direction of rotation according to the arrow 243 in FIG. 7 and the cam path 241 of the first cam disc 238 increases in the opposite second output direction of rotation of the output shaft 240. A drive movement of the first cam disc 238 in the first drive direction (arrow 244) effects a pivoting of the mirror plate 211. A rotation of the second cam disc 239 in the second opposite output direction of rotation (arrow 243) effects a pivoting of the tub link 225.

The rotary movement of the cam discs 238 and 239 which are driven by oppositely installed free-wheels 245 and 246 clamping on the output shaft, is effected by changing the direction of rotation of the gear motor 233 which is coupled to the output shaft 240. The first free-wheel 245 is on the right in FIG. 7 and the second 246 on the left.

When the motor 233 is switched in for the direction of rotation according to the arrow 243 the first cam disc 238 is coupled for torque transmission via its free-wheel 245 to the output shaft 240, whereas the second cam disc 239 runs freely in the same direction of rotation via its associated free-wheel 246 but is not coupled for torque-transmission with the output shaft 240. This free entrained rotation in the direction of the arrow 243 can lead unintentionally to the pivoting of the tub link 225 associated with the second cam disc 239 although this is not desired. If the output direction of rotation of the motor 233 is reversed (arrow 244) the conditions are the converse. The cam disc 238 is then freely entrained although it is not in torque-transmitting connection with the output shaft 240. This unintentionally adjusts the mirror plate 211. This unintentional movement due to free entrained rotation must be prevented. For this purpose the cam discs 238, 239 each have a non-positively acting return stop. The first cam disc 238 is blockable by means of its return stop against a rotary movement in the direction of the arrow 244 oppositely to the first torque-transmitting output direction of rotation according to the arrow 243. The second cam disc 239 is blockable by means of its associated return stop against a rotary movement in the same direction as the first output direction of rotation according to the arrow 243. The return stops may take the form of roller free-wheels or the like or alternatively sprung friction pins or friction discs.

The second embodiment (FIGS. 8–12) corresponds fundamentally to the first embodiment (FIGS. 3 to 6) the description of which applies essentially to the second embodiment as well.

Figure 10:
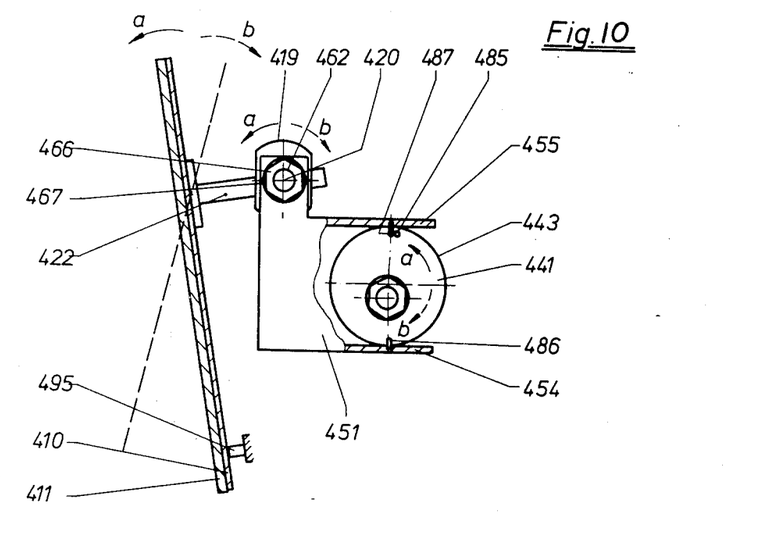
FIG. 10 is a schematic end view of the right adjusting means in the direction of the arrow XXVII of FIG. 8.
Figures 11, 12:
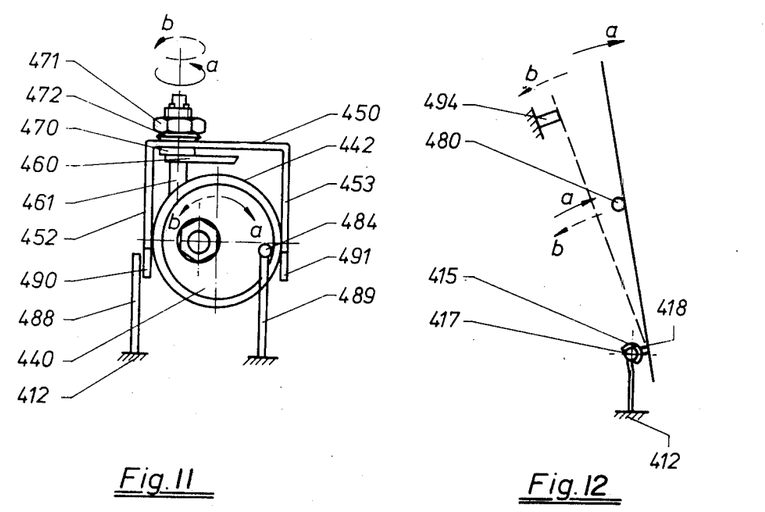
FIG. 11 is a schematic end view of the left adjusting means in the direction of the arrow XXVIII of FIG. 8.
FIG. 12 is a schematic plan view of the mirror plate in two positions.

The bearing head 419 is pivotally mounted in the holder 413 fixed with respect to the housing. The guide slot 421 is open to the right. The mirror plate pivoting in the ball joint 417, 418 about the vertical pivot axis 415 leads to a pivoting in the direction of the arrows a and b (FIG. 12) and a mirror plate 411 tilting about the substantially horizontal axis 416 to a movement in the direction of the arrows a and b in FIG. 10. For the adjustment two electrical reversible direct-current gear motors 430, 431 are provided each having driven eccentric discs 440 and 441 respectively, the first gear motor 430 with the eccentric disc 440 serving for pivotal adjustment of the mirror plate 411 about the vertical axis 415 and engaging the mirror plate 411 via a U-shaped fork 450, whereas the second gear motor 431 with the eccentric disc 441 serves for the tilting adjustment about the axis 416 and engages by means of a U-shaped fork 451 on the bearing head 419. For switching on the gear motor 430, 431 a switch is provided on the vehicle dashboard which like a crane switch in logical manner switches the gear motor 430 and/or 431 on corresponding to the desired pivot or tilt position. The two fork legs 452, 453 of the first fork 450 and in similar manner, the two fork legs 454, 455 of the second fork 451 engage over the associated eccentric disc 440 and 441, respectively, within the disc plane and substantially free of play and not spaced from the outer peripheral face 442 and 443, respectively. There is only point contact. On revolution of the first eccentric disc 440 in the right direction (arrow a shown in a solid line) the right-hand fork leg 453 in FIG. 11 is subjected to the action of the peripheral face 442 of the eccentric disc 440, whereas the opposite fork leg 452 is only in point contact with the peripheral face 442 in substantially play-free manner. When the second eccentric disc 441 revolves in the left direction of rotation (FIG. 10, arrow a) the fork leg 455 is acted upon by the peripheral face 443 of the eccentric disc 441 while the opposite fork leg 454 is only in point contact with the peripheral face 443 in substantially play-free manner.

Figure 8:
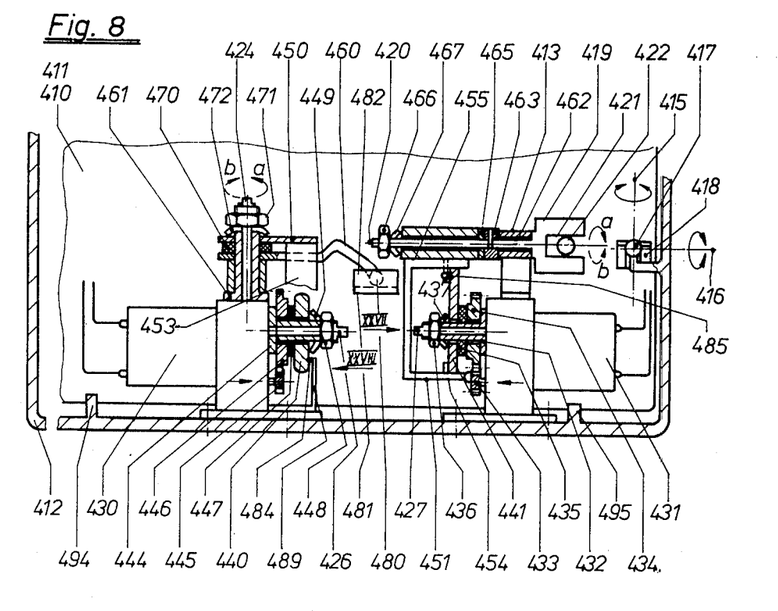
FIG. 8 is a vertically sectioned rear view of a mirror according to another embodiment.
Figure 9:
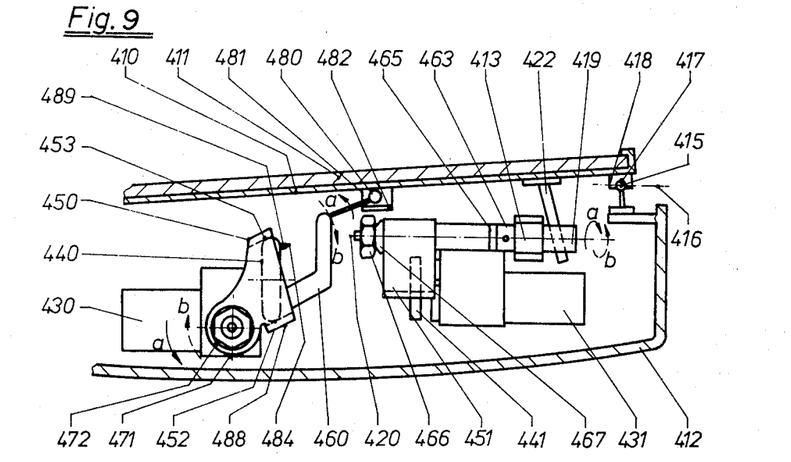
FIG. 9 is a schematic partially horizontally sectioned plan view of the mirror of FIG. 8.

The left fork 450 in FIGS. 8 and 9 is pivotally mounted with respect to the housing 412 about an axis which can extend substantially parallel to the two fork legs 452, 453 and to the axis 415. The first eccentric disc 440 is, seen transversely of the disc plane, in the form of a spherical section so that the outer peripheral face 442 thereof has the form of a circular arc. The fork 450 is operatively coupled to a pivot lever 460 which engages the frame 410 by means of a pull-push mounting but is otherwise freely moveable. The operative coupling in the power path between the fork 450 and the pivot lever 460 and in the power path between the second fork 451 and the bearing head 419 is in each case comprises a slip clutch with adjustable slip action. For this purpose the pivot lever 460 and the first fork 450 are arranged on a pivot sleeve 461 and clamped together with interposition of the slip clutch. Similarly, the bearing head 419 and the fork 451 are disposed on a common head shaft 462 and tensioned together with interposition of a slip clutch. The slip action of each slip clutch is adjustable via the axial tensioning force in such a manner that the torque necessary to overcome the static friction of the slip clutch is greater than the drive torque necessary for the pivot drive or tilt drive of the mirror plate 411 about the axis 415 or 416, respectively.

The bearing head 419 is non-rotatably mounted on the head shaft 462 which carries a non-rotatably mounted coupling disc 463 and a slip or brake-lining disk 465. The fork 451 is traversed by the head shaft 462 in spaced relationship substantially at right angles to the fork legs 454, 455 thereof and by means of an adjusting nut 466 with interposed spring washers 467 held on the head shaft 462 and pressed with adjustable spring force against the lining disc 465 and the slip coupling disc 463. Thus, the mirror plate 411 may be tilted manually about the axis 416 with the eccentric disc 441 and fork 451 stationary by pivoting the bearing head 419 with head shaft 462 and coupling disc 463, overcoming the static friction of the lining disc 465, relatively to the fork 451 about the bearing axis 420. The mirror plate 411 can be manually adjusted in this manner with the drive stationary. The pivot lever 460 and the fork 450 are mounted spaced from the fork legs 452, 453 pivotally on the pivot sleeve 461 which is pivotally moveable on a journal 424. Disposed on the pivot sleeve 461 between the pivot lever 460 and the first fork 450 is a slip or brake lining disc 470. The fork 450 is adapted to be pressed by means of an adjusting nut 471 screwed onto the pivot sleeve 461 with interposed spring washers 472 with adjustable spring force against the lining disc 470 and the pivot lever 460 so that the mirror plate 411, when the eccentric disc 440 and fork 450 are stationary, is pivotal manually about the axis 415 by pivoting the lever 460, overcoming the static friction of the lining disc 470, relatively to the fork 450 about the axis of the pivot sleeve 461. When the gear motor 430 is stationary the mirror plate 411 can thus be pivoted manually also about the axis 415.

The pull-push mounting of the pivot lever 460 comprises a ball 480 at the pivot lever end and the ball bears on the back of the frame 410 of the mirror plate 411. Furthermore, a substantially angular flat spring 481 is mounted on the back of the frame 410. The ball 480 is accommodated between the angle leg 482 of the flat spring 481 and the back of the frame 410, the lever 460 thus exerting a pull-push effect on the mirror plate 411 but otherwise being freely moveable.

Each eccentric disc 440, 441 with fork 450 and 451 respectively comprises an end stop means for disengaging the gear to limit the revolution movement of the eccentric disc 440 and 441 in the two drive directions of rotation (arrows a, b) to a periperal angle of about 180° and separates the eccentric disc 440 or 441 from the drive. For disengaging the gear a slip clutch is disposed between each of the eccentric discs 440, 441 and its drive member and the slip action of the clutch may be adjusted via the axial tensioning force so that the torque necessary to overcome the static friction of the slip clutch is greater than the drive torque necessary for the pivot drive (axis 415) or tilt drive (axis 416) of the mirror plate 411 about the axes 415 and 416.

The first eccentric disc 440 is rotatably mounted on a bushing 444 fitted on the motor 430 on a stationary journal 426, a drive gear 446 also being arranged on said bushing and meshing with the driven pinion 445. Between the drive gear 446 and the eccentric disc 440 on the bushing 444 there is a slip or brake lining disc 447 which is adhered or fastened to the drive gear 446 or the eccentric disc 440. The eccentric disc 440 is adapted to be pressed by means of an adjusting nut 448 screwed onto the bushing 444 with interposed spring washers 449 with adjustable spring force against the lining disc 447 and the drive gear 446 so that when the eccentric disc 440 runs against one of the end stop means and is held fixed, the disc may be uncoupled, overcoming the static friction of the lining disc 447, by the drive gear 446, the latter continuing to rotate with reduced speed.

The eccentric disc 441 is correspondingly rotatably mounted on a bushing 432 mounted rotatably on the associated gear motor 431 on a journal 427 and on this bushing a drive gear 434 meshing with the driven pinion 433 of the gear motor 431 is also mounted. Arranged on the bushing 432 between the drive gear 434 and second eccentric disc 441 is a slip or brake lining disc 435 which is adhered to one of these two. The eccentric disc 441 is pressed by means of an adjusting nut 436 screwed onto the bushing 432 with interposed spring washers 437 with adjustable spring force against the lining disc 435 and the drive gear 434.

Each eccentric disc 440, 441 comprises on the end face remote from the gear motor 430 or 431, respectively, an axially projecting stop pin or tab 484 and 485, respectively. The second fork 451 carries on the inside of each fork leg 454, 455 a blocking pin 486 or 487 substantially perpendicular thereto, which with its free end projects into the path over which the stop pin 485 travels radially up to the eccentric disk centre and when the disc 441 is pivoted in both directions of rotation (arrows a and b) through in each case about a 180° peripheral angle forms an end stop for the stop pin. The eccentric disc 441 can thus rotate in both directions according to the arrows a and b only through about 180° peripheral angle in each case. Alternatively, the end stop means may be adapted to the eccentric disc 440. The eccentric disc 440 may have associated therewith two stud bolts 488 and 489 fixed with respect to the housing. The stud bolts 488 and 489 lie on the track through which the stop pin 484 travels when the eccentric disc 440 is pivoted in both directions of rotation according to the arrows a and b through in each case about 180° peripheral angle. The two stud bolts 488 and 489 form with their free upwardly directed end face the end, stop for the stop pin 484.

If the mirror plate 411 is to be pivoted about the axis 415, for example, in the direction of the arrow a (FIG. 12), the gear motor 430 is switched on by correspondingly actuating the switch. The eccentric disc 450 is thus driven via the driven pinion 445, the drive gear 446 and the lining disc 447 in the right direction according to the arrow a in FIG. 11. The eccentric disc 440 rotates with increasing eccentricity and acts with its peripheral face 442 on the fork leg 453. The fork 450 and, coupled thereto via the lining disc 470, the pivot lever 460 are thereby pivoted about the axis of the pivot sleeve 461 in the direction of the arrow a. The ball 480 thus presses against the back of the mirror plate 411 also in the pivot direction a. When the eccentric disc 440 has reached the end position shown in FIG. 11 the stop pin 484 meets the stud bolt 489 and blocks the pivoting. The gear motor 430 then continues to run with reduced speed, since the gear 446 is further driven via the driven pinion 445, the static friction due to the lining disc 447 being overcome so that when the eccentric disc 440 is stationary the drive gear 446 can continue to rotate.

If the mirror plate 411 is to be pivoted in the opposite direction (arrow a) about the axis 415, the switch is correspondingly actuated so that the gear motor 430 drives the eccentric disc 440 in the opposite sense (arrow b, FIG. 11). The fork 450 with the pivot lever 460 pivots about the axis of the pivot sleeve 461 in the opposite direction (arrow b), the mirror plate 411 thus being pivoted into the position shown in dashed lines in FIG. 12.

If the adjusting unit via the gear motor 430 has failed, the mirror plate 411 can be manually pivoted into both positions (FIG. 12). For pivoting the mirror plate 411 in the arrow direction b (FIG. 12) a pressure is exerted on the mirror plate 411 at the mirror edge opposite the ball 417. The mirror plate presses via the ball 480 onto the pivot lever 460 and attempts to pivot the latter about the axis of the pivot sleeve 461. Since when the gear motor 430 is stationary, due to the self-locking of the gear, the eccentric disc 440 is also non-rotatable, on this pivoting of the lever 460 the fork 450 cannot be entrained. However, the pivot lever 460 can pivot relatively to the fork 450 about the axis of the pivot sleeve 461 and change its relative angular position with respect to the fork 450 in that the static friction between the lever 460 and fork 450 is overcome, which is due to the lining disc 470. The pivot lever 460 thus slips in the region of the disc 470 with respect to the fork 450 about the axis of the pivot sleeve 461. When the gear motor 430 is again ready for operation, the mirror plate 411 is pressed manually against a rear stop 94 (FIG. 12) fixed with respect to the housing and the gear motor 430 switched on by corresponding actuation of the switch so that it brings the eccentric disc 440 out of the one end position (FIG. 11) by rotation in the arrow direction b into the other end position. At the latest on reaching this other end position the pivot lever 460 and the fork 450 have again reached the relative rotational position with respect to each other which they had before manual adjustment of the mirror plate 411. By corresponding switching of the switch the eccentric disc 440 is now driven in the arrow direction a, so that the mirror plate 411 is pivoted by the motor in the arrow direction a or oppositely in the arrow direction b (FIG. 12).

The tilting adjustment of the mirror plate 411 about the axis 416 is effected in similar manner. For this purpose, the switch is correspondingly actuated, for example, so that a mirror adjustment takes place in the arrow direction a (FIG. 10). The eccentric disc 441 is driven in the arrow direction a and the fork leg 455 acted upon by the eccentric disc 441. The fork 451 is pivoted in the arrow direction a about the axis 420, which effects a pivoting of the bearing head 419 with guide pin 422 and thus of the mirror plate 411. The pivotal movement of the eccentric disc 441 is terminated when the stop pin 485 meets the blocking pin 487. The eccentric disc 441 is then stationary, but the gear motor 431 continues to run, with reduced speed. The drive gear 434 is further driven, the static friction of the lining disc 435 being overcome.

If the mirror plate 411 is to be adjusted by the electric motor in the opposite direction (dashed line in FIG. 9) the switch is brought into the corresponding position and the gear motor 431 reversed. This effects a drive of the eccentric disk 441 in the opposite direction (FIG. 10, arrow b) and also of the fork leg 454, the fork 451 and the bearing head 419 thus pivoting about the axis 420 of the head shaft 462 in the arrow direction b until the stop pin 485 meets the blocking pin 486 and blocks the adjustment. The mirror plate 411 has now reached its other end position.

On failure of the adjustment via the gear motor 431 the mirror plate 411 can also be tilted manually, for example, into the position shown in dashed line in FIG. 10. The upper edge of the mirror plate 411 is pressed and the latter pivoted via the guide pin 422, the bearing head 419 with head shaft 462 and coupling disc 463 about the axis 420. The static friction of the lining disc 465 is overcome so that the bearing head 419 can be pivoted relatively to the fork 451 about the axis 420.

When the gear motor 431 is operable again the mirror plate 411 is first pressed manually against a stop 495 (FIG. 10) and the gear motor 431 then switched on for moving the eccentric disc 441 into the end position according to FIG. 10 in which the bearing head and the fork 451 again assume the correct angular position with respect to each other.

The two stops 494, 495 fixed with respect to the housing are arranged at the back of the mirror plate 411. They are formed, for example, by integral portions or housing edges. The stop 494 serves for limiting the maximum pivot angle of the mirror plate 411 when the latter is pivoted manually about the axis 415 in the arrow direction b. The stop 495 serves to limit the maximum pivot angle when the mirror plate 411 is tilted manually about the axis 416 in the pivot direction (arrow a, FIG. 10). The stops 494, 495 are of significance when, after failure of the gear motors 430, 431, the exact angular coupling between the fork and associated part to be driven is to be reestablished. Firstly, the mirror plate 411 is pressed by pivot movement and/or tilting movement against the stop 494 and/or 495. The gear motor is then switched on in the direction which effects a power adjustment of the mirror plate in the same sense as previously effected manually. At the latest when the eccentric disc driven by the gear motor has reached its blocked end position in this drive direction of rotation the exact angular position is again obtained between the fork and the part acting on the mirror plate, i.e. the pivot lever 460 or the bearing head 419. Thus, special manipulations in the interior of the mirror housing and of the mirror mechanism are not necessary.

We claim:

1. A setting and adjusting device for rearview mirrors mounted on a vehicle body comprising a mirror housing adapted to be mounted on the vehicle body, a mirror plate having a rear surface and a front reflecting surface, means for adjustably mounting said mirror plate in said housing for pivoting and tilting said mirror plate about a substantially vertical axis and a substantially horizontal axis, respectively, end stop means for limiting the pivoting and tilting of said mirror plate, controllable adjusting means upon actuation and release thereof, respectively, for pivoting and tilting said mirror plate about said horizontal and vertical axes into predetermined lateral and vertical positions, respectively, and against said stop means, respectively, a pivot lever and a bearing head, respectively, being operatively mounted to said mirror plate so as to positively engage said mirror plate in a pivot and tilt direction, respectively, and so as to be freely moveable relative to said mirror plate in a non-pivoting and non-tilting direction, respectively, frictional slip coupling means for independently connecting said pivot lever and said bearing head to an associated said adjusting means, respectively.

2. The device according to claim 1, wherein said adjusting means, respectively, includes a first fork and a second fork, respectively, each said slip coupling means, respectively, constitutes an operative coupling in a path of power between said first fork and said pivot lever, and in a path of power between said second fork and said bearing head, respectively.

3. The device according to claim 1, further comprising means for adjusting slipping action of said slip coupling means.

4. The device according to claim 2, further comprising two common axles, said pivot lever and said first fork are disposed on one of said common axles and are clamped together with one of said slip coupling means therebetween, said bearing head and said second fork are disposed on the other of said common axles and are clamped together with the other of said slip coupling means therebetween.

5. The device according to claim 4, wherein said adjusting means is for adjusting slipping action by axial clamping force such that torque necessary for overcoming static friction of said slip coupling means is greater than that necessary for the pivoting and tilting of the mirror plate via said adjustment means about said substantially vertical and horizontal axis, respectively.

6. The device according to claim 2, further wherein said coupling means including, a head shaft, a clutch disc non-rotatably connected to said head shaft, a brake lining disc operatively connected to said head shaft, said bearing head is non-rotatably connected to said head shaft, said second fork has fork legs, said head shaft is located spaced apart from and substantially perpendicular to said fork legs, said head shaft pivotally traverses said second fork with clearance and defines a bearing axis, means, comprising an adjusting nut and springs located between said adjusting nut and said second fork for holding said second fork on said head shaft and for pressing said second fork with adjustable spring force operatively against said brake lining disc and said clutch disc, said adjusting means includes first and second eccentric discs, respectively, operatively engaging said first fork and said second fork, respectively, whereby when said second eccentric disc and said second fork are stationary, said bearing head and said mirror plate operatively connected thereto are manually tiltable about said bearing axis relatively to said second fork about said substantially horizontal axis, respectively, by means of said bearing head with said head shaft and said clutch disc pivotally overcoming static friction of said brake lining disc.

7. The device according to claim 2, said first fork includes fork legs, a journal operatively fixed to the housing, said coupling means including, a pivot sleeve pivotally disposed on said journal, said pivot lever and said first fork are pivotally mounted on said pivot sleeve spaced from said fork legs, a brake lining disc is disposed on said pivot sleeve between said pivot lever and said first fork, said adjusting means includes a first eccentric disc operatively engaging said fork legs, means, comprising an adjusting nut and springs engaging between said adjusting nut and said first fork engaging said pivot sleeve, for pressing said first fork with adjustable spring force against said brake lining disc and operatively for pressing said brake lining disc against said pivot level, such that when said first eccentric disc and said first fork are stationary, said pivot lever and said mirror plate are normally pivotal about the axis of said pivot sleeve relative to said first fork and about said substantially vertical axis, respectively, by means of pivoting of said pivot lever overcoming static friction of said brake lining disc.

8. A setting and adjusting device for rearview mirrors mounted on a vehicle body comprising a mirror housing adapted to be mounted on the vehicle body, a mirror plate having a rear surface and a front reflecting surface, means for adjustably mounting said mirror plate in said housing for pivoting and tilting said mirror plate both about a substanitally vertical axis and a substantially horizontal axis, respectively, end stop means for limiting the pivoting and tilting of said mirror plate, controllable adjusting means upon actuation and release thereof, respectively, for pivoting and tilting said mirror plate about said horizontal and vertical axes in to predetermined lateral and vertical positions, respectively, and against said stop means, respectively, a pivot lever and a bearing head respectively being operatively mounted to said mirror plate engaging said mirror plate positively in a pivot and tilt direction, respectively, and so as to be freely moveable relative to said mirror plate is a non-pivoting and non-tilting direction, respectively, frictional slip coupling means for independently connecting said pivot lever and said bearing head to an associated said adjusting means, respectively, pull-push means for mounting said pivot lever a ball mounted at one end of said pivot lever, said ball bears against said rear surface of said mirror plate, a substantially angular leaf spring secured to said rear surface of said mirror plate and having an angle leg oriented substantially parallel to said rear surface of said mirror plate and spaced therefrom defining an intermediate space, said ball being accommodated in said intermediate space engageable with said angle leg and said rear surface of said mirror plate.

9. A setting and adjusting device for rearview mirrors mounted on a vehicle body comprising a mirror housing adapted to be mounted on the vehicle body, a mirror plate having a rear surface and a front reflecting surface, means for adjustably mounting said mirror plate in said housing for pivoting and tilting said mirror plate both about a substantially vertical axis and a substantially horizontal axis, respectively, end stop means for limiting the pivoting and tilting of said mirror plate, controllable adjusting means upon actuation and release thereof, respectively, for pivoting and tilting said mirror plate about both said horizontal and vertical axes into predetermined lateral and vertical positions, respectively, and against said stop end means, respectively, a pivot lever and a bearing head, respectively, being operatively mounted to the mirror plate so as to positively engage said mirror plate in a pivot and tilt direction, respectively, and so as to be freely moveable relative to said mirror plate in a non-pivoting and non-tilting direction thereof, respectively, frictional slip clutch means for independently connecting said pivot lever and said bearing head to an associated said adjusing means, said adjusting means includes gear motors and drive members connected to said gear motors, respectively, and first and second eccentric disc respectively operatively connected to said gear motors, the latter providing driving torque thereto, and a first pivot fork and a second pivot fork respectively disposed operatively engagingly about said first and second eccentric discs, said first eccentric disc cooperatively with said first pivot fork and said second eccentric disc cooperatively with said second pivot fork each includes limit stop means for defining rotary end positions of said eccentric discs, respectively, said limit stop means for limiting the rotary movement of each said eccentric discs in both drive directions of rotation to a peripheral angle of about 180°, respectively, said drive members include gear decoupling means for separating a respective of said eccentric discs from the driving torque of associated of said gear motors, respectively, after said limit stop means has limited the rotary movement of said eccentric disc, respectively.

10. The setting and adjusting device for rearview mirrors mounted on a vehicle body as set forth in claim 9, wherein
said gear decoupling means constitute slip clutchs.

11. The setting and adjusting device for rearview mirrors mounted on a vehicle body as set forth in claim 10, wherein
each said slip clutch includes adjustment means for adjusting slipping action of said slip clutch,
each said slip clutch is disposed respectively between said eccentric discs and said drive members of the associated said gear motors.

12. The setting and adjusting device for rearview mirrors as set forth in claim 11, wherein
said adjustment means is for adjusting the slipping action of said clip via axial clamping force such that torque necessary for overcoming static friction of said slip clutchs respectively is greater than drive torque necessary for a pivoting drive or tilting drive of the mirror plate, respectively, about said substantially vertical and horizontal axes between said end positions.

13. The setting and adjusting device as set forth in claim 9, wherein
each said eccentric disc on an end face thereof includes an axially projecting projection disposed adjacent the outer peripheral surface thereof and substantially on a portion of said outer peripheral surface of largest eccentricity, said projection constituting a part of said limit stop means,
two projecting means for at least one of said forks are fixed with respect to said housing are cooperatively associated with corresponding of said projections and are disposed spaced from said end face of said eccentric disc at right angles to an axis of rotation of said eccentric disc on two sides of said eccentric disc respectively at equal distances from a center thereof and are disposed in a path through which said projection travels when said eccentric disc is rotated in both directions of rotation respectively through about a 180° peripheral angle up to engagement of said projections with said two projecting means, respectively,
said end face of said eccentric disc faces away said motor,
said two projecting means each has a free end face constituting a limit stop for said projection,
said pivot forks have two legs each,
said two fork legs of the first pivot fork each have lower free ends facing said projecting means which are formed with a recess cooperatively disposed relative said projecting means such that said projecting means passes therethrough when said first fork is pivoted about an axis of rotation thereof by rotation of said first eccentric disc.

14. A setting and adjusting device for rearview mirrors, comprising
a mirror housing adapted to be mounted on the vehicle body,
a mirror plate having a rear surface and a front reflecting surface,
means for adjustably mounting said mirror plate in said housing for pivoting and tilting said mirror plate about a substantially vertical axis and a substantially horizontal axis, respectively,
end stop means for limiting the pivoting and tilting of said mirror plate,
controllable adjusting means upon actuation and release thereof, respectively, for pivoting and tilting said mirror plate about said horizontal and vertical axes into predetermined lateral and vertical positions, respectively, and against said end stop means, respectively,
a pivot lever and a bearing head operatively disposed mounted to said mirror plate so as to positively engage said mirror plate in a pivot and tilt direction, respectively, and so as to be freely moveable relative to said mirror plate in a non-pivoting and non-tilting direction thereof, respectively,
frictional slip coupling means for independently connecting said pivot lever and said bearing head to an associated said adjusting means, respectively,
said adjusting means each includes,
a gear motor mounted on said housing,
a stationary journal mounted on said motor,
a bushing rotatably mounted on said journal,
an eccentric disc mounted rotatably on said bushing,
a pinion driveably connected to said motor,
a drive gear is rotatably mounted on said bushing and meshes with said pinion of said gear motor,
a brake lining disc is rotatably mounted on said bushing between said drive gear and said eccentric disc,
limit stop means for limiting rotation of said eccentric disc,
means, comprising an adjusting nut and springs engaging between said nut and said bushing, for pressing said eccentric disc with adjustable spring force against said brake lining disc and the latter against said drive gear such that when said eccentric disc runs against said limit stop means and is held fixed said eccentric disc is uncouplable from said drive gear by overcoming static friction of said brake lining disc and thereby said eccentric disc is uncoupleable from drive torque of the drive gear, said drive gear continuing to rotate with reduced speed.

15. The setting and adjusting device for rearview mirrors as set forth in claims 9 or 14, wherein
each said eccentric disc on an end face thereof includes an axially projecting projection disposed adjacent the outer peripheral surface thereof and substantially on a portion of said outer peripheral surface of largest eccentricity, said projection constituting a part of said limit stop means.

16. The setting and adjusting device for rearview mirrors as set forth in claim 9, wherein
each said eccentric disc on an end face includes an axially projecting projection disposed adjacent the outer peripheral surface thereof and substantially on a portion of said outer peripheral surface of sargest eccentricity, said projection constituting a part of said limit stop means,
each said pivot forks has fork legs,
a projecting member disposed on an inside of each said fork leg of one of said pivot forks extending substantially perpendicular thereto and having a free end and projecting radially relative to said eccentric disc so far such that said free end projects into a path of travel of said projection, and constitutes an end stop for said projection when said eccentric disc is pivoted in both directions, respectively, of rotation through about a 180° peripheral angle.

17. The device according to claim 15, further comprising two projecting means for at least one of said forks are fixed with respect to said housing are cooperatively associated with corresponding of said projections and are disposed spaced from said end face of said eccentric disc at right angles to an axis of rotation of said eccentric disc on two sides of said eccentric disc respectively at equal distances from a center thereof and are disposed in a path through which said projection travels when said eccentric disc is rotated in both directions of rotation respectively through about a 180° peripheral angle up to engagement of said projections with said two projecting means, respectively, said end face of said eccentric disc faces away from said motor, said two projecting means each has a free end face constituting a limit stop for said projection.

18. The device according to claim 14, wherein said adjusting means includes a first pivot fork and a second pivot fork, each said eccentric disc on an end face thereof includes an axially projecting projection disposed adjacent the outer peripheral surface thereof and substantially on a portion of said outer peripheral surface of largest eccentricity, said projection constituting a part of said limit stop means.

two projecting means for at least one of said forks are fixed with respect to said housing are cooperatively associated with corresponding of said projections and are disposed spaced from said end face of said eccentric disc at right angles to an axis of rotation of said eccentric disc on two sides of said eccentric disc respectively at equal distances from a center thereof and are disposed in a path through which said projection travels when said eccentric disc is rotated in both directions of rotation respectively through about a 180° peripheral angle up to engagement of said projections with said two projecting means, respectively, said end face of said face eccentric disc faces away from said motor, said two projecting means each has a free end face constituting a limit stop for said projection, said pivot forks have two legs each, said two fork legs of the first pivot fork each have lower free ends facing said projecting means which are formed with a recess cooperatively disposed relative said projecting means such that said projecting means passes therethrough when said first fork is pivoted about an axis of rotation thereof by rotation of said first eccentric disc.

19. The setting and adjusting device as set forth in claim 17, wherein said projection is a stop pin, and said projecting means are stud bolts.

20. A setting and adjusting device for rearview mirrors mounted on a vehicle body comprising a mirror housing adapted to be mounted on the vehicle body, a mirror plate having a rear surface and a front reflecting surface, means for adjustably mounting said mirror plate in said housing for pivoting and tilting said mirror plate about a substantially vertical axis and a substantially horizontal axis, respectively, end stop means for limiting the pivoting and tilting of said mirror plate, controllable adjusting means upon actuation and release thereof, respectively, for pivoting and tilting said mirror plate about said horizontal and vertical axes into predetermined lateral and vertical positions, respectively, and against said stop means, respectively, said adjusting means include gear motors, a pivot lever and a bearing head operatively mounted to said mirror plate so as to positively engage said mirror plate in a pivot and tilt direction, respectively, and so as to be freely moveable relative to said mirror plate in a non-pivoting and non-tilting direction thereof, frictional slip coupling means for independently connecting said pivot lever and said bearing head to an associated said adjusting means, said mirror housing includes at least two stops fixed with respect to said housing and disposed adjacent the rear surface of said mirror plate, one of said stops constitutes means for limiting a maximum pivot angle upon manual pivoting of said mirror plate about said substantially vertical axis in a direction and the other of said stops constitutes means for limiting a maximum tilt angle of said mirror plate upon manual tilting about said substantially horizontal axis in a direction, said two stops constitute said end stop means.

21. The setting and adjusting device as set forth in claim 20, wherein said adjusting means includes eccentric discs operatively connected to said gear motors, said end stop means, after failure of an associated of said gear motors and upon manual adjustment of the mirror plate when said gear motors are again ready for operation, for correcting an angular drive coupling between said pivot lever and said first fork and between said bearing head and said second fork, respectively, said mirror plate is pressable firstly manually in a pivot direction and/or a tilt direction against a corresponding one of said stops and thereafter said associated gear motor is switchable on for pivotally driving and tiltably driving respectively in a same pivoting and tilting direction respectively until a corresponding of said eccentric discs has reached an end position whereby an accurate angular drive coupling is established.

* * * * *

UNITED STATES PATENT AND TRADEMARK OFFICE
CERTIFICATE OF CORRECTION

PATENT NO. : 4,247,172
DATED : January 27, 1981
INVENTOR(S) : Erich Wunsch et al It is certified that error appears in the above-identified patent and that said Letters Patent are hereby corrected as shown below:

Claim 7  Column 13  Line 41  "normally" should read --manually--

Claim 8  Column 14  Line 1  "is" should read --in--

Line 7 after "lever" insert --comprising-- and sub-indent the next two paragraphs Claim 16  Column 16  Line 54  the word "sargest" should read --largest--

Signed and Sealed this

Twenty-eighth Day of April 1981

[SEAL]

Attest:

RENE D. TEGTMEYER

Attesting Officer     Acting Commissioner of Patents and Trademarks